United States Patent [19]

Layden et al.

[11] 4,194,727
[45] Mar. 25, 1980

[54] SHAPE CUTTING APPARATUS

[75] Inventors: Lawrence M. Layden, Stanton, N.J.; James R. Thomson, Bolivar, N.Y.

[73] Assignee: Airco, Inc., Montvale, N.J.

[21] Appl. No.: 10,100

[22] Filed: Feb. 7, 1979

Related U.S. Application Data

[63] Continuation of Ser. No. 844,776, Oct. 25, 1977, abandoned.

[51] Int. Cl.² .................... B23K 7/02; B23K 7/10
[52] U.S. Cl. ............................... 266/58; 266/60; 266/67; 266/68; 266/69
[58] Field of Search ................. 266/69, 58, 60, 67, 266/68

[56] References Cited

U.S. PATENT DOCUMENTS

| | | | |
|---|---|---|---|
| 2,389,585 | 11/1945 | Anderson | 266/69 |
| 2,433,734 | 12/1947 | Bucko | 266/69 |
| 2,508,468 | 5/1950 | Rathje, Jr. | 266/69 |
| 3,119,724 | 1/1964 | Campbell | 266/69 |
| 3,704,373 | 11/1972 | Bardwell et al. | 266/60 |
| 3,866,892 | 2/1975 | Hooper | 266/69 |
| 3,912,242 | 10/1975 | Schoffmann | 266/69 X |
| 4,065,109 | 12/1977 | Ogden | 266/69 |
| 4,072,301 | 2/1978 | Brouwer | 266/60 |

Primary Examiner—W. Stallard
Attorney, Agent, or Firm—David A. Draegert; Edmund W. Bopp; Larry R. Cassett

[57] ABSTRACT

Shape cutting apparatus includes a transverse beam rigidly mounted on a pair of spaced carriages which are provided with wheels for translation along a pair of parallel, longitudinal rails. A tracer and holder assembly therefor are mounted for translation along the transverse beam. Each carriage is provided with a servomotor, which motors are connected electrically in parallel across a source of potential such as the output of a servoamplifier. Upon energization of the motors, the beam is driven along the rails at speeds up to 120 i.p.m. and greater while the tracer cornering capability is equivalent to the capability previously only attainable at lower speeds, e.g. 50–60 i.p.m. Thus, higher cutting speeds are obtained without degradation of cutting accuracy and without resort to expensive structural stiffening, additional electronic control circuitry, or precision rack and pinion carriage drive mechanisms.

10 Claims, 4 Drawing Figures

SHAPE CUTTING APPARATUS

This is a continuation of application Ser. No. 844,776, filed Oct. 25, 1977, now abandoned.

BACKGROUND OF THE INVENTION

The present invention relates to shape cutting machines and more particularly, to shape cutting machines having improved tracing capabilities.

Shape cutting machines have been utilized for many years to cut predetermined patterns in metal plates by means of oxygen-fuel flames or plasma arcs. Typically, one or more torches which are adapted to issue such flames are secured to an assembly which is mounted for translation along a transverse beam. A pair of carriages are typically utilized to support the beam together with appropriate gas and electrical control devices and are effective to translate the beam longitudinally along a set of rails. A tracing assembly, which may be mounted on a cantilever portion of the transverse beam, is effective to follow a template or the like and generate electrical signals indicative of the line or edge of the template being followed. A servomotor is provided for driving the tracer holder assembly along the transverse beam in an orthogonal direction with respect to the rails.

Torch holder assemblies are mounted for translation on the transverse beam and are mechanically connected to the tracer holder assembly. Thus the torch holder assemblies are driven along the transverse beam by the servomotor mounted on the tracer holder assembly. Prior art flame cutting machines have generally utilized a single drive motor mounted on one of the carriages for translating both carriages and the transverse beam assembly longitudinally to enable cutting of metal plate or the like in the two-dimensional pattern. As a consequence of the center of gravity of the transverse beam assembly being noticeably displaced from the drive motor mounted on a carriage, the transverse beam assembly tends to twist or skew when driven by a single side mounted carriage drive and consequently, "squareness" between the beam and rails, etc. is lost. This skewing effect tends to degrade the ability of the tracing assembly to follow a given line or edge which results in less than desirable cutting performance. More specifically, upon a tracing head "seeing" or following a corner on a template or the like, the tracer holder assembly is caused to undergo a sharp change in direction to follow such corner and the resulting twisting or skewing causes the tracer assembly to overshoot or undershoot the line it is intended to follow. Oscillations may be induced in the beam and cause degradation of tracing performance. Thus, prior art flame cutting systems utilizing a single carriage drive have not been effective to enable a satisfactory degree of tracer accuracy during cornering at relatively high speeds which decreases the economic benefits potentially obtainable from flame cutting systems. For example, such prior art flame cutting systems have been limited to cutting speeds of approximately 50–60 i.p.m. and attempts to increase speeds have led to significant degradation of cutting performance.

One approach to the foregoing problems of improving flame cutting machine operation is to simply stiffen or rigidify the structural components of the system such as the transverse beam assembly, carriages, etc. Although such an approach will enable improved tracer and flame cutting machine operation, the cost thereof becomes exorbitant in comparison to the improved performance.

In addition to the foregoing attempts to improve flame cutting operation, it is well known to provide tracing systems with a "lead" compensation such that the tracer effectively views the line or edge ahead of its actual position and generates appropriate electrical signals for driving the system servomotors accordingly. By anticipating changes in the line or edge to be followed, improved machine operation will be attained; however, in the event the lead distance is too short, the tracer will tend to overshoot the line to be followed and should the lead distance be too long, the tracing assembly will tend to inscribe a corner. If the system is capable of following a radius no greater than the kerf radius the resultant part will have a sharp corner. However, even with lead compensation, adequately rigidified machine frames must be provided to enable the benefits of such compensation to be obtained.

Thus, traditional prior art approaches to improving cutting machine operation have been a compromise of system performance with rigidity which has limited the degree to which machine performance can be improved at any reasonable cost.

It has been proposed to provide drive motors with each carriage of a shape cutting machine and certain systems incorporating this concept have been constructed. Typically, such systems utilize extremely rigid machine frames and/or relatively expensive synchrosystems in which a phase locked loop circuit is utilized to control the phases of signals supplied to each motor and thereby maintain the motors in precise synchronism with one another. In addition, it has been found necessary with such prior art dual side drive systems to utilize a pair of precision rack and pinion drives for translation of the carriages in a longitudinal direction. The additional cost of such sophisticated electronic circuitry and precision racks renders these prior art dual side drive systems extremely expensive. Other cutting systems utilizing a motor for driving each of a pair of carriages are illustrated in U.S. Pat. Nos. 2,389,585 and 3,912,242. Each of the systems described therein is utilized for simply effecting longitudinal cuts in metal slabs and neither machine is capable much less suitable for use in following two dimensional templates as neither machine is provided with any mechanism for driving torch assemblies along a transverse beam. Furthermore, each assembly described in the foregoing patents specifically utilizes a swivel mechanism for enabling a transverse beam to rotate to an out of square position during such cutting, which operation is to be avoided by cutting machine systems in accordance with the present invention.

Accordingly, there exists a clear need for shape cutting machines which perform in accordance with industrial standards and operate at higher cutting speeds but do not require extensive structural stiffening, sophisticated electronic control circuitry or precision rack and pinion drives.

OBJECTS

It is an object of the present invention to provide improve shape cutting machines.

It is a further object of the present invention to provide shape cutting machines which operate with satisfactory mechanical stability at higher operating speeds without requiring excessive frame or structural rigidity.

It is yet another object of the present invention to provide shape cutting machines capable of satisfactorily negotiating corners at higher speeds than have heretofore been possible with single side drive systems.

It is still another object of the present invention to provide shape cutting machines having improved tracing capability yet which do not require sophisticated electronic controls therefor.

Other objects of the present invention will become apparent from the detailed description of an exemplary embodiment thereof which follows and the novel features of the present invention will be particularly pointed out in conjunction with the claims appended hereto.

SUMMARY

In accordance with the present invention, shape cutting apparatus is comprised of a transverse beam rigidly mounted on spaced carriages which in turn are provided with wheels for translation along parallel, longitudinal rails. One or more torch holder assemblies are mounted for translation along the transverse beam and means such as tracing assemblies, etc. are provided for selectively driving the torch holder assembly therealong. First and second servomotor means are each mounted on separate carriages and connected electrically in parallel with one another to a source of electric potential, such as the output of a servoamplifier. The foregoing dual side drive servomotor means enables translation of carriages at speeds of up to 120 i.p.m. or more but still permits the tracer assembly to negotiate corner radii heretofore only possible at lower tracer speeds, i.e. 50-60 i.p.m. and without the use of structural stiffening and/or sophisticated electronic control circuitry such as phased locked loop circuits for synchronized motor operation. Preferably, the torch holder assembly is mounted on the bridge portion of the transverse beam between the spaced carriages while the tracer assembly is mounted on the cantilever portion of the beam. By utilizing a carriage mechanism having wheels which engage essentially flat rails as opposed to precision rack and pinion drives, the flamecutting or plasma arc cutting apparatus in accordance with the present invention enables the benefits of considerably more expensive systems to be obtained yet at a substantially lower cost.

BRIEF DESCRIPTION OF THE DRAWING

The invention will be more clearly understood by reference to the following description of exemplary embodiments thereof in conjunction with the following drawing in which:

FIG. 1A is a schematic diagram of a circuit for energizing the electrical motors depicted in FIG. 1 hereof;

DESCRIPTION OF PREFERRED EMBODIMENT

Figure 1:
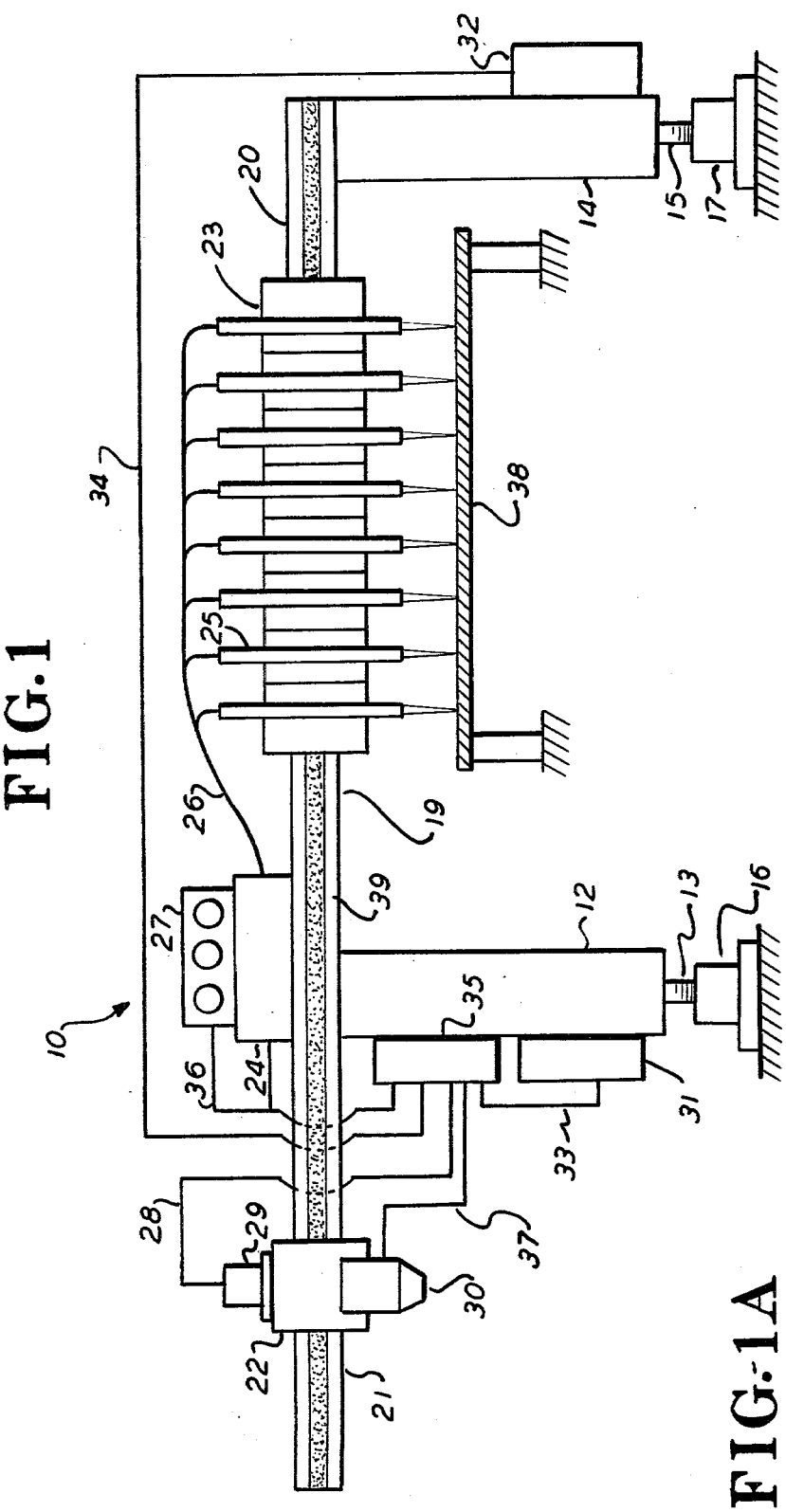
FIG. 1 is a diagrammatic view of torch cutting apparatus utilizing dual side servomotors in accordance with the invention.

The present invention relates to improved shape cutting apparatus and provides a solution to the problem of controlling motion of a heavy mass from a point remote to the center of gravity thereof but yet with relatively 'limber' equipment. The mass which is to be controlled during motion is the transverse beam having torch holder assemblies mounted thereon. The torches are operable in known manner to make a corresponding number of cuts in metal plate. The most difficult form of motion to be controlled is to cause the torch holder assembly to sharply negotiate a right angle corner detected by the tracer assembly or prescribed by a numerical control system. For example, the torch holder assembly may be translated in a direction parallel to the transverse beam at a speed of e.g. 120 i.p.m. Upon the tracer assembly or numerical control system providing output signals representative of a right angle turn to a control means, the velocity of the torch holder assembly in the transverse direction must be brought to zero as soon as possible while the maximum velocity (120 i.p.m. or so) must be reached in the longitudinal direction from an initial zero velocity. Clearly, some corner radius will be inscribed upon such a turn being negotiated although at such speeds single side drive prior art systems have not been able to corner with generally acceptable radii. Accordingly, the performance of cutting machines utilizing a single side drive has been limited to speeds on the order of 50-60 i.p.m. and in order to improve such typical performance, prior art systems have resorted to a compromise between performance and rigidity. That is, performance can be improved by substantially stiffening or rigidifying structural elements of the cutting machine system but only at great added expense.

In accordance with the present invention, each carriage is provided with servomotor means with each such motor being connected electrically in parallel with the other and connected to a source of electrical potential, typically a servoamplifier output. By utilizing such dual side drive means for translating cutting machine carriages along a longitudinal direction, squareness between the transverse beam and the longitudinal rails may be achieved notwithstanding operating speeds of 120 i.p.m. or more and cornering, etc. by the tracer assembly. In addition to avoiding loss of tracing capability by using dual side drive servomotors in accordance with the invention, it has been found that expensive stiffening of the transverse beam and other structural components of the cutting machine is unnecessary as is the use of a rack and pinion drive for translation of the carriages. Thus, by using dual side drive carriage servomotors in accordance with the invention, improved cutting performance is attained at a substantially lower cost than would be incurred if structural stiffening, rack and pinion drive, and phase locked loop circuitry were resorted to in order to obtain comparable performance.

Referring now to FIG. 1, illustrated therein is an examplary embodiment of shape cutting apparatus 10 which includes a pair of carriages 12 and 14 which will be described in greater detail in connection with the embodiment thereof illustrated in FIG. 2. Wheels 13 and 15 are provided with carriages 12 and 14, respectively, with such wheels being mounted for translation along rails 16 and 17. Transverse beam 19 which is rigidly mounted on and extends across carriages 12 and 14 includes a bridge portion 20 and a cantilever portion 21. Torch holder assemblies 23 which may include conventional devices for supporting a plurality of oxygen-fuel cutting torches 25 or plasma arc torches (not shown) above a metal plate 38 is mounted for translation along the length of transverse beam 20. A servomotor 29 is provided to drive tracer holder assembly 22 in response to signals provided from control device 27 and servoamplifier 35. In addition, a suitable hose assembly 26 is adapted to supply oxyge, fuel, and necessary coolant to torches 25 and is connected between such torches and control device 27 and gas control panel 24. Elements 27-30 are commercially available in the form of a device sold by Canadian Westinghouse Limited under the Model No. HL 71B. Tracing assembly 30 is mounted on the cantilever portion 21 of transverse beam 19 and is effective in known manner to follow a line or edge on a template or pattern (not shown) positioned therebelow. Tracer holder assembly 22 is preferably mechanically connected to torch holder assemblies 23 by means of band 39 which extends over the whole length of beam 19 and is driven by pulleys (not shown) in a conventional manner. Tracer assembly 30 is connected by line 37 to servoamplifier 35. It will be understood that torch holder assemblies 23 may include means for raising and lowering torches 25 and as such devices are well known to those skilled in the art, further description thereof is not considered necessary.

Dual side drive servomotors 31 and 32 are mounted on carriages 12 and 14, respectively, and are effective to drive wheels 13 and 15 along rails 16 and 17, the longitudinal direction of travel of apparatus 10. Servomotors 31 and 32 are connected through resistances R in parallel with one another and across a source of electrical potential E as indicated in FIG. 1A. This connection is shown in FIG. 1 by means of lines 33 and 34 connecting motors 31 and 32, respectively, to servoamplifier 35 which in turn is connected through line 36 to control device 27. Servomotors 31 and 32 are preferably coupled to wheels 13 and 15, respectively, by suitable reduction gearing well known to those skilled in the art.

In operation, tracing assembly 30 on cantilever portion 21 of beam 19 will begin to follow a line or edge on a template (not shown) and is effective to generate electrical signals representative of the position of such line or edge. These signals are supplied over line 37 to servoamplifier 35 which after torches 25 are ignited, will supply electrical signals to servomotors 29, 31 and 32 thereby driving the transverse beam 19 in a longitudinal direction and torch holder assembly 23 in a transverse direction at a rate corresponding to the velocity of tracing head 30 and thereby causing torches 25 to cut patterns in plate 38 identical to the pattern or template being followed by tracer head 30. By utilizing dual side drive servomotors 31 and 32 connected electrically in parallel with one another, transverse beam 19 is maintained in a square relationship with carriages 12 and 14 and thereby enables tracer head 30 to negotiate corners at a greater velocity for the same radius of curvature which is obtained by single side drive systems only at substantially lower speeds. Thus, the shape cutting apparatus according to the invention enables improved tracing and cutting performance without resorting to expensive structural stiffening of the apparatus nor complex electronic circuitry, or rack and pinion drives as mentioned heretofore. It is believed that the reason dual side drive servomotors 31 and 32 enable a given corner radius to be obtained at a greater cutting and tracing speed than has been heretofore possible with single side drive systems is that servomotors 31 and 32 operate at the same speed and any tendency of the unbalanced mass (e.g. transverse beam 19 and torch holder assembly 23) to twist or skew in one direction with respect to rails 16 and 17 as a result of being driven by one servomotor is counteracted by the drive supplied by the other servomotor. In addition, by connecting such servomotors 31 and 32 in parallel, as the load on one motor increases the current drawn thereby increases and consequently, such motor provides a greater torque thereby precluding the load from skewing or twisting beam 20 with respect to rails 16 and 17. Finally, the operation of shape cutting apparatus 10 can be effected with conventional wheels engaging rail 16 and 17 and expensive precision rack and pinion tracks are not required.

Figure 2:
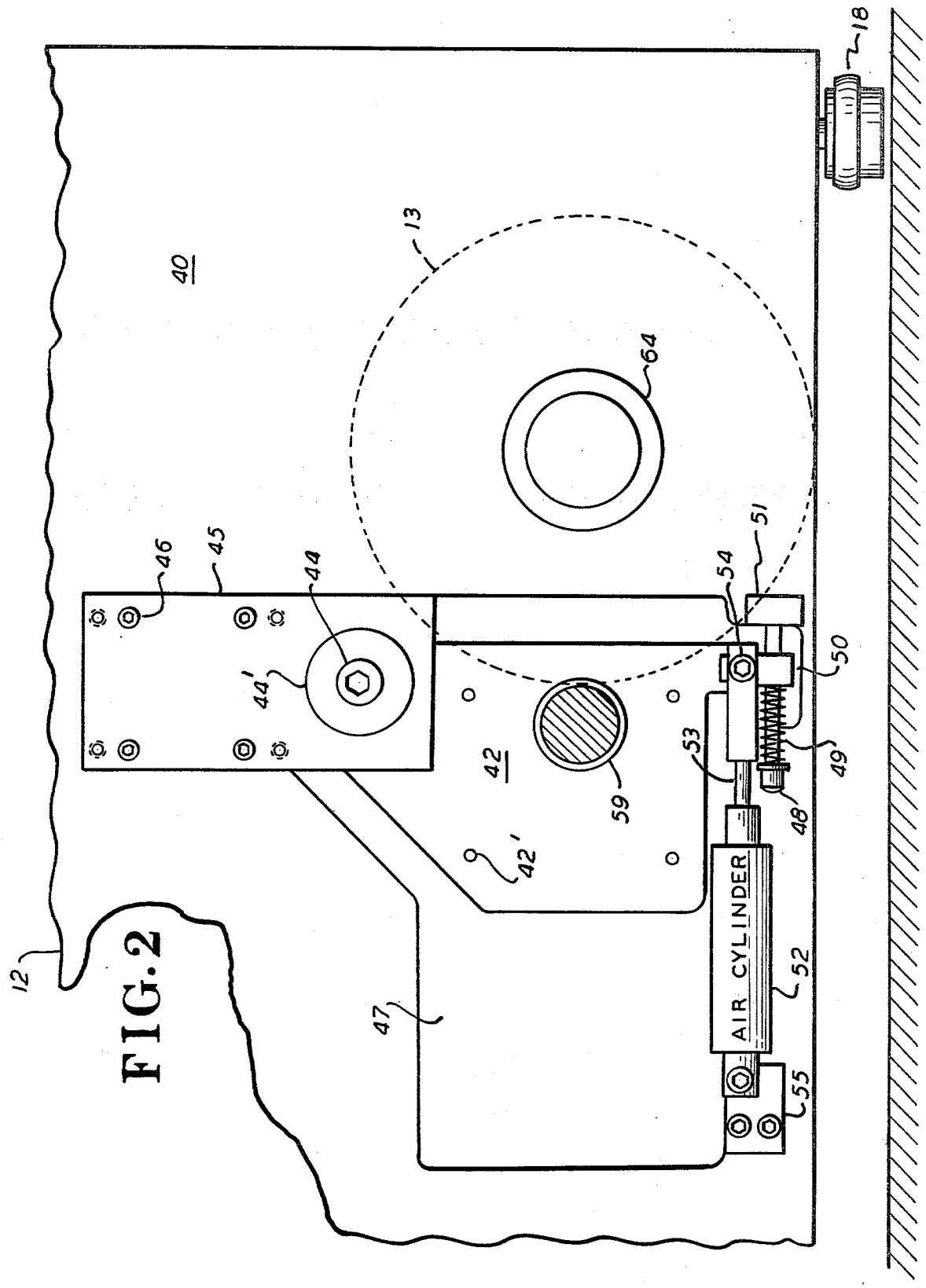
FIG. 2 is an elevational view of an exemplary embodiment of a carriage suitable for use in connection with the shape cutting apparatus according to the invention.
Figure 3:
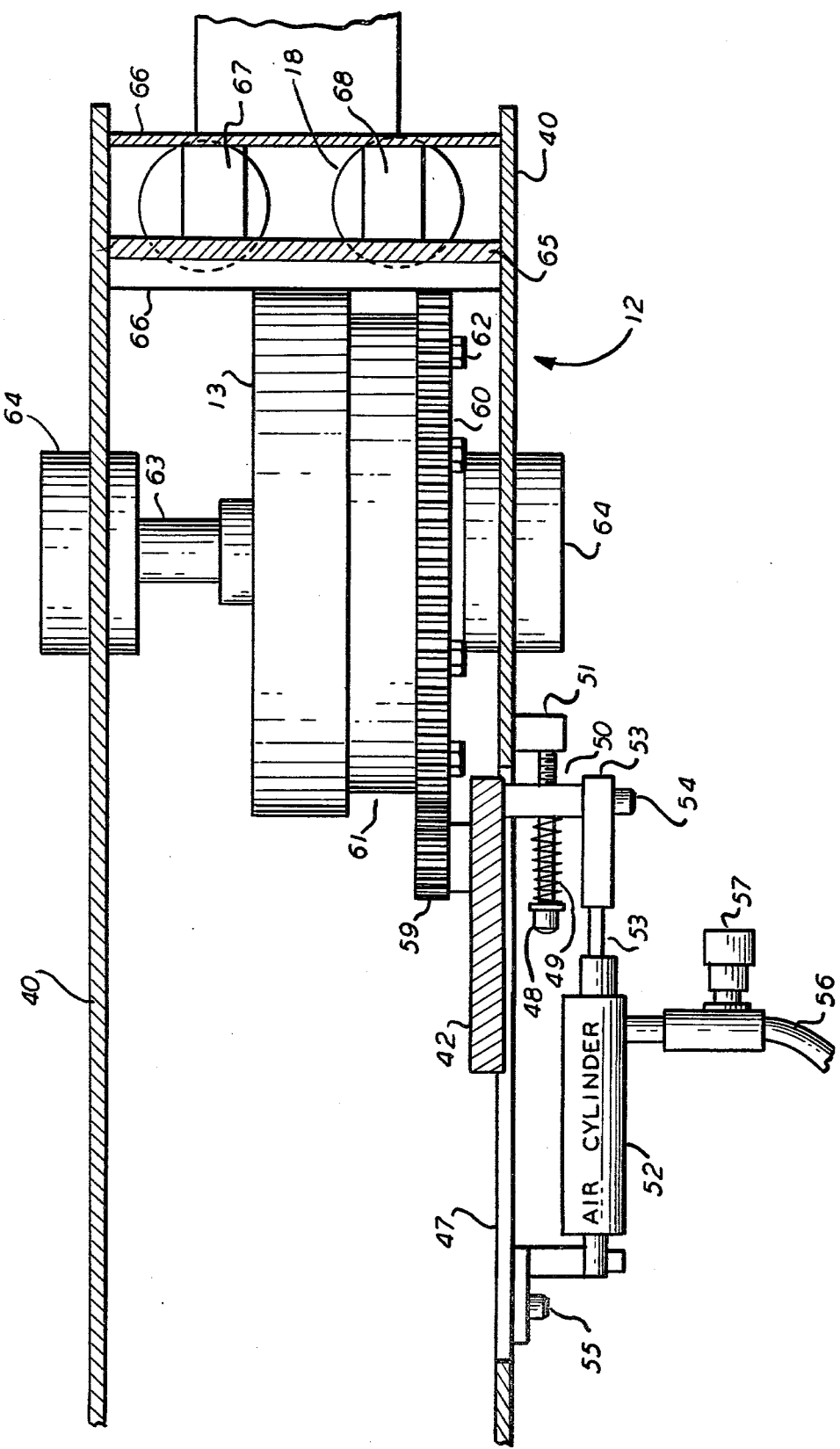
FIG. 3 is a plan view of the carriage depicted in FIG. 2.

Referring now to FIG. 2, illustrated therein is an exemplary embodiment of carriage 12 and the structure necessary for driving such carriage and wheel 13 along rail 16. Wheel 13 is rotatably mounted in carriage sides 40 by means of bearings 64 journalled therein. A motor mount plate 42 is pivotally affixed to pivot mount plate 45 by means of bolt 44 and needle bearing 44' with pivot mount 45 being secured to carriage side 40 by means of bolt 46. Apertures 42' are provided in plate 42 to enable mounting of servomotor 31 (FIG. 1) thereon while carriage side 40 is provided with an access aperture 47. In order to engage a drive pinion 59 (FIG. 3) which is driven by motor 31 (FIG. 1) with spur gear 60, a spring 49 is wound about bolt 48 which extends through member 50 affixed to motor mount plate 42 and which engages nut block 51 which in turn is rigidly affixed to carriage side 40. Spring 49 which may exert force of approximately 40–50 lb. is effective to bias pivot plate 42 in a counter-clockwise direction and thus engage drive pinion 59 with spur gear 60 (FIG. 3). An air cylinder 52 is affixed at one end to bracket 55 which is secured to carriage side 40 and is provided with an arm 53 extending from the other end thereof which arm is affixed by means of bolt 54 to member 50. As illustrated in FIG. 2, carriage 12 may be provided with guide roller 18 which engages one side of rail 16 and preferably, a pair of such guide rollers are utilized with carriage 12.

Referring now to FIG. 3, illustrated therein is a plan view of the carriage mechanism illustrated in FIG. 2 and the structure not previously described will now be discussed. An air supply hose 56 is connected through a flow control valve 57 and to air cylinder 52 and, in known manner, compressed air from a suitable source (not shown) may be selectively supplied to actuate and release air cylinder 52. For purposes of clarity, servomotor 31 (FIG. 1) is not illustrated in FIG. 3 although it will be understood that drive pinion 59 is rotatably driven by such motor means 31. Wheel 13 is preferably mounted on axle 63 and is affixed to spacer 61 which in turn is affixed to spur gear 60, preferably by means of bolts 62 or the like. As mentioned previously, axle 63 is journalled in carriage side 40 by means of suitable bearings 64. A suitable bracket or support member 66 which extends between carriage sides 40 may be utilized to assist in supporting wall 65 which is preferably affixed at either end thereof to carriage sides 40 and by means of support elements 67 and 68 to a further support wall 66. As illustrated in FIG. 3, support element 67 and 68 are utilized to rotatably mount guide rollers 18 for engagement with rail 60 (FIG. 2).

In order to drive carriage 12, the supply of air to cylinder 52 is interrupted thereby releasing arm 53 and permitting spring 49 to operate against member 50 and bias or pivot motor mount plate 42 such that drive pinion 59 engages spur gear 60. At this time, drive pinion 59 is rotated to thereby drive spur gear 60 and wheel 13 under the control of servomotor 31 (FIG. 1). In the event it is desired to remove such drive from wheel 13, an adjustable air pressure is supplied through hose 56 and valve 57 to air cylinder 52, thereby operating arm 53 to translate member 50 against the bias of spring 49 and disengage drive pinion 59 from spur gear 60. Accordingly, the carriage drive mechanism illustrated in FIGS. 2 and 3 provide a reliable and efficient control over the driving force available to be applied to wheel 13.

It will be understood that by providing shape cutting apparatus with a dual side drive as described heretofore, improved tracing and cutting machine performance can be obtained without resort to extensive structural stiffening and/or sophisticated electronic control circuitry. However, in the event that a particular portion of the apparatus 10, such as cantilever portion 21 of beam 19 undergoes noticeable oscillations, a simple reinforcing strut connected in the horizontal plane between cantilever portion 21 and carriage 12, may well significantly if not totally eliminate such oscillations.

Although a loading of spring 49 of approximately 40–50 lb. has been described in connection with the carriage drive mechanism illustrated in FIGS. 2 and 3, it will be understood that other spring loading can be utilized as long as the drive pinion 59 will firmly engage spur gear 60. Spring 49 is, of course, utilized to overcome any eccentricity caused by an imperfect bore through motor mount plate 42 or imperfect mounting of servomotor 31 (FIG. 1) thereon and to remove any backlash in the gearing.

It will be understood that although the shape cutting apparatus illustrated in FIG. 1 includes a tracing assembly 30 mounted on the cantilever portion 21 of beam 19, it is within the scope of the present invention to utilize other means for supplying control signals to servoamplifier 35 and to servomotors 29, 31 and 32. For example, numerical control systems, well known to those skilled in the art, may be positioned independently of beam 19 and yet may be employed to supply predetermined control signals to servoamplifier 35, etc. It will be appreciated that by so utilizing a numerical control system, the cantilever portion 21 of beam 19 is rendered unnecessary.

The foregoing and other various changes in form and details may be made without departing from the spirit and scope of the present invention. Consequently, it is intended that the appended claims be interpreted as including all such changes and modifications.

What is claimed is:

1. Shape cutting apparatus including torch holder assembly means mounted on a transverse beam and adapted to be driven along said beam, control means for selectively driving said torch holder assembly along said beam which is rigidly mounted on first and second carriages, the improvement comprising:
    first and second electric servomotor means coupled to said control means and connected electrically in parallel with one another and means for mounting said first and second servomotor means on said first and second carriages, respectively, such that upon energization of both said servomotor means, said carriages are driven at substantially the same speed along a pair of spaced, parallel longitudinal rails and said transverse beam is maintained in an essentially orthogonal relationship with respect to said rails.

2. Shape cutting apparatus defined in claim 1 additionally comprising a tracer assembly mounted for translation along said transverse beam and means for coupling said tracer assembly to said means for driving said torch holder assembly.

3. Shape cutting apparatus defined in claim 1 wherein said transverse beam is comprised of a bridge portion between said carriages and a cantilever portion extending from said bridge portion and said tracer assembly being mounted on said cantilever portion.

4. Shape cutting apparatus as defined in claim 1 wherein said torch holder assembly is comprised of a plurality of cutting torches and said control means includes means for supplying oxygen and fuel to each of said torches to enable cutting of a metal plate located therebelow.

5. Shape cutting apparatus as defined in claim 1 wherein each of said carriages includes carriage sidewalls and a pair of wheels, each wheel being mounted on an axle which extends between, and is rotatably mounted on, said carriage sidewalls.

6. Shape cutting apparatus as defined in claim 5 wherein said means for mounting said first and second servomotor means comprises plate means pivotably secured to one of said carriage sidewalls, said plate means having an aperture therethrough for receiving a drive pinion coupled to one of said servomotor means and means for securing said one servomotor means to said plate means.

7. Shape cutting apparatus as defined in claim 6 additionally comprising a rigid member extending from said plate means and spring means acting against said member to bias said plate means and said drive pinion into driving engagement with said wheel.

8. Shape cutting apparatus as defined in claim 7 additionally comprising a spur gear mounted on said axle and rigidly secured to said wheel, said spur gear adapted to be driven by said drive pinion and said spring means being effective to bias said drive pinion into driving engagement with said spur gear.

9. Shape cutting apparatus as defined in claim 8 additionally comprising means for retracting said spring means to disengage said drive pinion from said spur gear.

10. Shape cutting apparatus as defined in claim 9 wherein said retracting means comprises a pneumatic cylinder connected to said carriage sidewall and to said plate means and means for actuating said cylinder such that upon actuation of said cylinder, said plate means is translated against the bias of said spring means to disengage said drive pinion from said spur gear.

* * * * *